United States Patent
Lin

(10) Patent No.: US 10,481,415 B2
(45) Date of Patent: Nov. 19, 2019

(54) VISION ASSISTIVE DEVICE CAPABLE OF ENHANCING LIGHT RECEIVING

(71) Applicant: Alexander Lin, Taipei (TW)

(72) Inventor: Alexander Lin, Taipei (TW)

( * ) Notice: Subject to any disclaimer, the term of this patent is extended or adjusted under 35 U.S.C. 154(b) by 0 days.

(21) Appl. No.: 15/379,516

(22) Filed: Dec. 15, 2016

(65) Prior Publication Data

US 2018/0173016 A1 Jun. 21, 2018

(51) Int. Cl.
*G02C 7/14* (2006.01)

(52) U.S. Cl.
CPC ........... *G02C 7/14* (2013.01); *G02C 2202/10* (2013.01)

(58) Field of Classification Search
CPC .......... G02C 7/04; G02C 7/028; G02C 7/041; G02C 7/02; G02C 7/042; G02C 7/047; G02C 2202/22; G02C 2202/14; G02C 2202/04; G02C 7/048; G02C 7/104; G02C 11/10; G02C 2200/02; G02C 2202/06; G02C 2202/08; G02C 2202/10; G02C 7/021
USPC ...... 351/159.02, 219, 205, 247, 246, 159.03
See application file for complete search history.

(56) References Cited

U.S. PATENT DOCUMENTS

| | | | | |
|---|---|---|---|---|
| 5,548,352 A | * | 8/1996 | Dewey | A61B 3/125 351/159.02 |
| 5,764,335 A | * | 6/1998 | Berke | A42B 1/247 351/41 |
| 6,299,304 B1 | * | 10/2001 | Demuth | G02C 7/14 351/158 |
| 6,976,758 B2 | * | 12/2005 | Khaw | A61B 3/117 351/205 |
| 2005/0225714 A1 | * | 10/2005 | Thir | G02C 7/14 351/59 |
| 2008/0151175 A1 | * | 6/2008 | Gross | G02C 7/086 351/45 |
| 2008/0165323 A1 | * | 7/2008 | Eisenberg | A61B 3/1225 351/219 |
| 2009/0185135 A1 | * | 7/2009 | Volk | G02B 17/0808 351/219 |

FOREIGN PATENT DOCUMENTS

CN 201311524 * 9/2009 ............... G02C 7/14

* cited by examiner

*Primary Examiner* — Evan P Dzierzynski
*Assistant Examiner* — Sharrief I Broome
(74) *Attorney, Agent, or Firm* — Lin & Associates Intellectual Property, Inc.

(57) ABSTRACT

The present invention provides a vision assistive device, including: a first reflector, a second reflector and a third reflector. The first reflector is disposed at a first position of a cornea of a human eye. The second reflector is disposed at a second position of the cornea of the human eye. The third reflector is directly disposed in front of the cornea of the human eye. The first reflector and the second reflector are configured to reflect external light such that the external light is focused at the third reflector. Then, the external light is reflected again by the third reflector to the human eye, thereby enhancing a light intensity of the external light received by the human eye.

9 Claims, 5 Drawing Sheets

VISION ASSISTIVE DEVICE CAPABLE OF ENHANCING LIGHT RECEIVING

BACKGROUND OF THE INVENTION

1. Field of the Invention

The present invention relates to a visual assistive device, more particularly, relates to a visual assistive device capable of enhancing the light intensity of external light received by human eyes.

2. The Prior Arts

Human eyes are important because they allow one to see the beautiful scenery in this world. Similar to the eyes of other mammals, human eyes have many uses. As a sense organ, human eyes are able to send signals to our brain in response to light so as to generate visions. When a person is looking at an object, external light is incident to the cornea, which is located at a back end of an eye, to form images. Rod cells and cone cells on the cornea of a human eye are able to distinguish the color and profile of the object based on a light intensity of the external light. In such a way, the images perceived by humans may have the depth of field effect.

Nyctalopia, also known as night blindness, is a common eye condition among adults. Night blindness is a condition that prevents human eye balls from receiving light effectively, thus making it difficult for the patient to see in dark or in environments with relatively low light. FIG. 1 is a schematic diagram illustrating an incident path of the external light entering a human eye. As shown in FIG. 1, when a human eye 1 is in an environment with relatively low light, some of the external light L in the environment will enter the human eye 1 from a side thereof. The external light L then passes through a cornea 10 and is emitted from another side of the human eye 1. When a patient with the condition of night blindness is in a low light environment, because of the low light condition in the environment, it is even harder for the external light in the environment to enter the human eye effectively. As a result, the patient may experience total blindness in such an environment.

Based on the above reason, it is still an unsolved problem for the industry to provide a device capable of focusing light in environments with relatively low light such that the external light in such an environment may be received by human light effectively.

SUMMARY OF THE INVENTION

Based on the above reasons, a primary objective of the present invention is to provide a vision assistive device capable of enhancing light receiving. The vision assistive device of the present invention includes: a first reflector, a second reflector and a third reflector. The first reflector is disposed at a first position of a cornea of a human eye. The second reflector is disposed at a second position of the cornea of the human eye. The third reflector is disposed directly in front of the cornea of the human eye. The first reflector and the second reflector are configured to reflect external light such that the external light is focused at the third reflector. Then, the external light is reflected again by the third reflector to the human eye, thereby enhancing a light intensity of the external light received by the human eye.

Preferably, the first position is located at a right edge of the cornea and the second position is located at a left edge of the cornea. The external light is focused as it passes through the right edge of the cornea, so the external light is enhanced and is amplified partially. Alternatively, the external light is focused as it passes through the left edge of the cornea, so the external light is enhanced and is amplified partially.

Preferably, the first reflector and the second reflector are shaped as a semicircular arc or are configured to have a rectangular shape, respectively.

Preferably, when the first reflector and the second reflector are shaped as the semicircular arc, the first reflector and the second reflector are configured to surround the human eye.

Preferably, the third reflector is a circular shape or a rectangular shape.

Preferably, the first reflector, the second reflector and the third reflector are disposed at the first position, the second position and a front position of the cornea of the human eye respectively by way of hanging via a frame.

Preferably, the frame is implemented as a headwear device.

Preferably, the first reflector and the second reflector are directly disposed on the cornea of the human eye at the first position and the second position.

Preferably, the third reflector is made of a translucent material or a transparent material.

Preferably, the first reflector and the second reflector are made of one of the following materials: an opaque material, a translucent material or a transparent material.

BRIEF DESCRIPTION OF THE DRAWINGS

FIG. 4b is a schematic view illustrating a human eye shown in FIG. 4a.

DETAILED DESCRIPTION OF THE PREFERRED EMBODIMENT

The accompanying drawings are included to provide a further understanding of the invention, and are incorporated in and constitute a part of this specification. It should be noted that the structure, ratio and size shown in the accompanying drawings of the present invention are only for illustrative purposes of the disclosure described in the specification, so those who skilled in the art may have a better understanding of the present invention.

Figure 1:
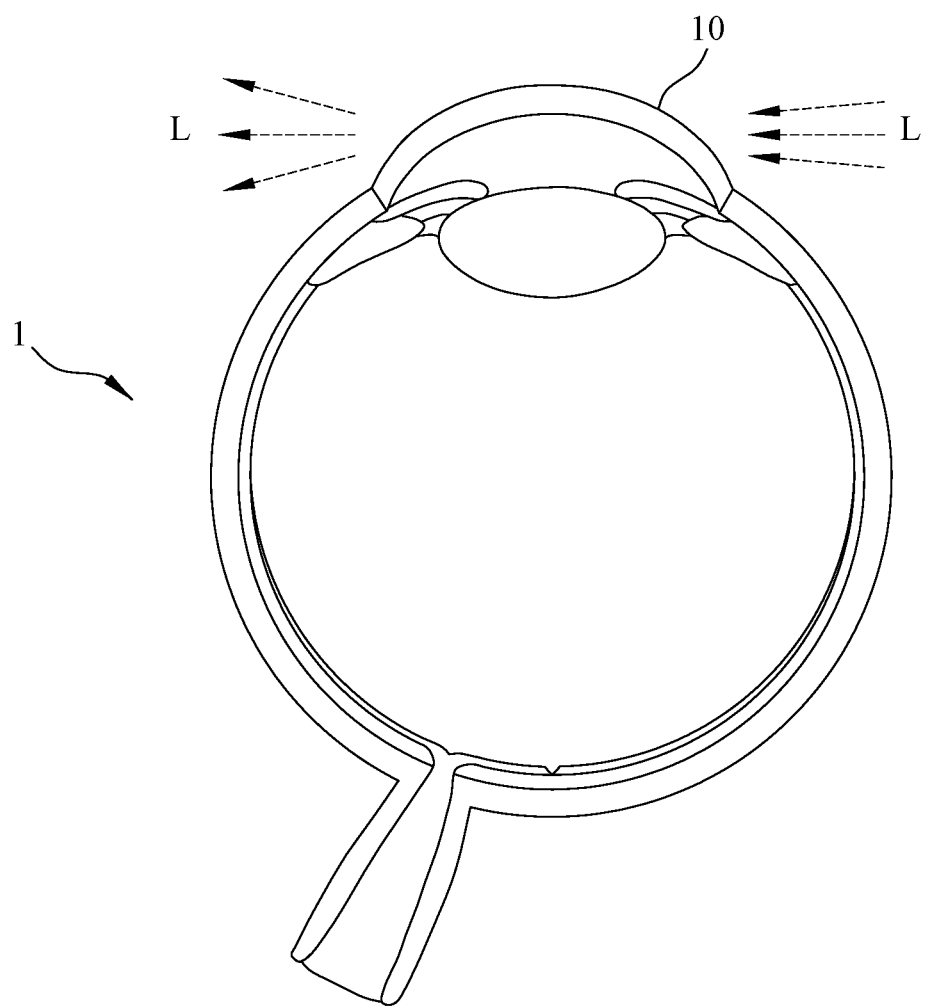
FIG. 1 is a schematic view illustrating an incident path of external light entering a human eye.
Figure 2:
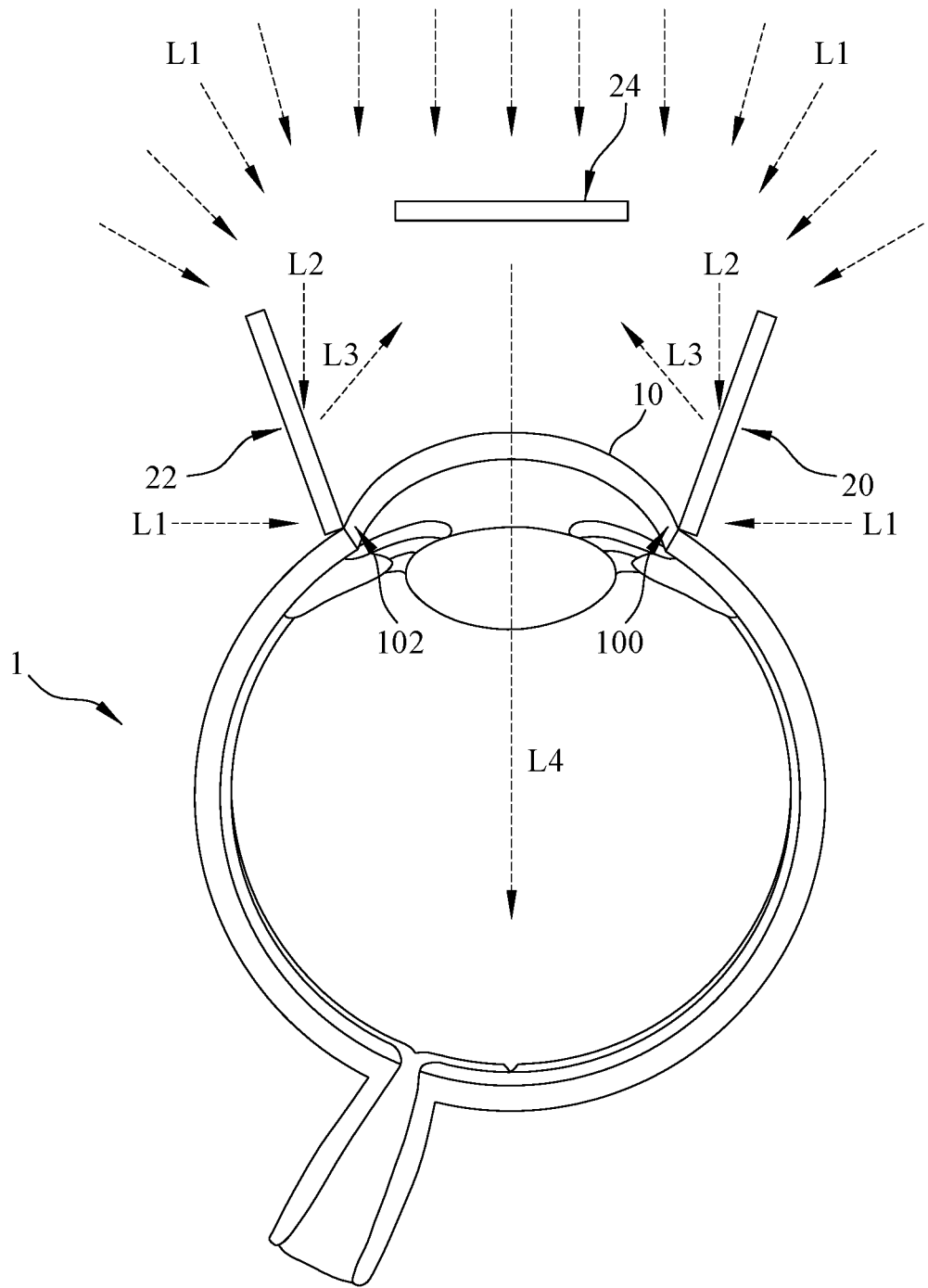
FIG. 2 is a schematic view illustrating the structure of a vision assistive device capable of enhancing light receiving according to an embodiment of the present invention.

FIG. 2 is a schematic view illustrating the structure of a vision assistive device capable of enhancing light receiving according to an embodiment of the present invention. As shown in FIG. 2, the vision assistive device according to an embodiment of the present invention includes a first reflector 20, a second reflector 22 and a third reflector 24. The first reflector 20 is disposed at a first location of a cornea 10 of a human eye 1. The second reflector 22 is disposed at a second location of a cornea 10 of the human eye 1. The third reflector 24 is disposed directly in front of the human eye 1.

Herein, the first position is at a right edge 100 of the cornea 10, and the second position is at a left edge 102 of the cornea 10.

When the device is in use, external light L1 is incident into the human eye 1 from all directions including the front side, the right side and the left side of the human eye 1. For the ease of understanding, the external light L1 is referred to as the incident light L2 shown in FIG. 2.

Before entering the human eye 1, the incident light L2 is incident on the first reflector 20 and the second reflector 22. The first reflector 20 and the second reflector 22 are configured to reflect the incident light L2 as reflected light L3, respectively, such that the reflected light L3 is reflected and focused at the third reflector 24. Then, the reflected light L3 is reflected again by the third reflector 24 as reflected light L4 such that the reflected light L4 is incident into the human eye 1.

In the first embodiment of the present invention, the first reflector 20 and the second reflector 22 are configured such that the external light L1 is reflected and focused at the third reflector 24 by the first reflector 20 and the second reflector 22. Then, the third reflector 24 is configured such that the focused external light L1 (i.e. the reflected light L4) is reflected into the human eye (e.g. reflected to the cornea) by the third reflector 24. As a result, a light intensity of the external light L1 received by the human eyes may be enhanced, and patients with night blindness condition may be able to see in environments with low light. It is worth mentioning that even though the third reflector 24 is disposed directly in front of the human eye 1 in one embodiment of the present invention, the third reflector 24 may also be disposed at other positions in other embodiments. For example, the third reflector 24 may also be disposed at an upper front position or a lower front position in front of the human eye 1.

Notably, as shown in FIG. 2, when the external light L1 passes through the right edge 100 (also known as the corneal limbus 100) of the cornea 10 (the external light L1 from the right side behind the first reflector may pass through the first reflector 20 first before passing through the right edge 100 of the cornea 10, or, the external light L1 may pass through the right edge 100 of the cornea 10 directly), the external light L1 is focused by the corneal limbus 100. In such a way, the external light L1 may be amplified and enhanced partially. Subsequently, the enhanced external light L1 is incident onto the second reflector 22 and is reflected as the reflected light L3. Herein, the second reflector 22 is configured such that the reflected light L3 is reflected and is focused at the third reflector 24. Then, the reflected light L3 is reflected by the third reflector 24 as the reflected light L4 and is reflected into the human eye 1.

Similarly, when the external light L1 passes through the left edge 102 (also known as the corneal limbus 102) of the cornea 10 (the external light L1 from the left side may be reflected by the second reflector 22 first before passing through the left edge 102 of the cornea 10, or, the external light L may pass through the left edge 102 of the cornea 10 directly), the external light L1 is focused by the corneal limbus 100. In such a way, the external light L1 may be amplified and enhanced partially. Subsequently, the enhanced external light L1 is incident onto the first reflector 20 and is reflected as the reflected light L3. Herein, the first reflector 20 is configured such that the reflected light L3 is reflected by the first reflector 20 and is focused at the third reflector 24. Then, the reflected light L3 is reflected by the third reflector 24 again as the reflected light L4 and is reflected into the human eye 1.

In other words, the vision assistive device according to one embodiment of the present invention may utilize the cornea limbus 100 or the cornea limbus 102 to focus external light L1, thereby achieving the purpose of partially amplifying and enhancing the external light L1. In addition, the enhanced external light L1 may be reflected into the human eye via the first reflector 20, the second reflector 22 and the third reflector 24, thereby enhancing the light intensity of the external light L1 received by the human eye 1. Furthermore, similar to the above description, part of the external light L1 that enters the human eye 1 from the front side will also pass through the right edge 100 or the left edge 102 of the cornea 10 (alternatively, the positions and angles of the first reflector 20, the second reflector 22 and the third reflector 24 may be adjusted, so the external light L1 that enters the human eye 1 from the front side will pass through the right edge 100 or the left edge 102 of the cornea 10). The external light L1 may be focused, partially amplified and enhanced by the right edge 100 or the left edge 102 before entering the human eye 1. In such a way, the light intensity of the external light L1 received by the human eye 1 may be enhanced.

On the other hand, in another embodiment of the present invention, the third reflector 24 may be made of a translucent material or a transparent material. With the third reflector being translucent or transparent, the external light L1 may be incident onto the first reflector 20 and the second reflector 22 without any obstacle therebetween. In addition, with a translucent or transparent third reflector, the sight of the patient will not be blocked or affected. The first reflector 20 and the second reflector 22 may be made of one of the following materials: an opaque material, a translucent material and a transparent material. The material choice of the first reflector 20 and the second reflector 22 may be selected based on the needs of the patient, so the incident light L2 may be reflected to the third reflector 24 and the sight of the patient may stay unaffected.

In one embodiment of the present invention, the first reflector 20 and the second reflector 22 may be shaped as a semicircular arc or may have a rectangular shape, and the third reflector 24 may have a circular shape or a rectangular shape. The structures of the first reflector 20 and the second reflector 22 that are shaped as a semicircular arc will be further described in the following section.

Figure 3:
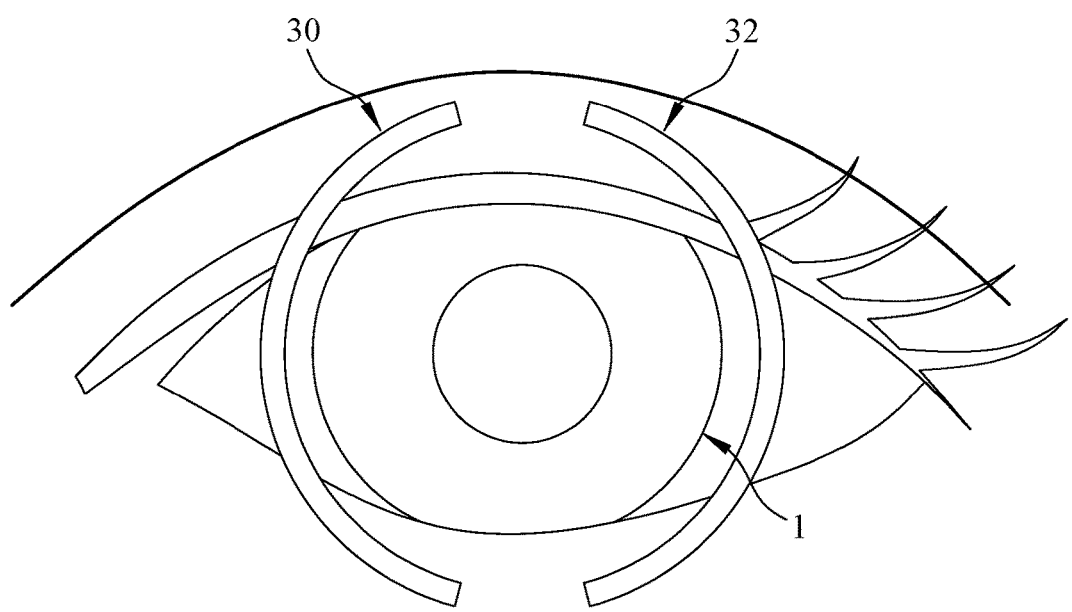
FIG. 3 is schematic view illustrating the structure of a first reflector and a second reflector according to another embodiment of the present invention, wherein the first reflector and the second reflector have a shape of semicircular arc.

FIG. 3 is a schematic view illustrating the structures of the first reflector and the second reflector with the shapes of semicircular arc. As shown in the front view of FIG. 3, it can be seen that a first reflector 30 and a second reflector 32 are shaped as a semicircular arc, respectively. When the first reflector 30 and the second reflector 32 are shaped as semicircular arcs, the first reflector 30 and the second reflector 32 may be configured to surround the human eye 1. As such, the gaps between the two reflectors and the human eye 1 may be minimized, and the external light may be reflected and focused at the third reflector (not shown in FIG. 3) (disposed directly in front of the human eye 1) in a more effective way. In addition, similar to the previous embodiment, the first reflector 30 and the second reflector 32 may be made of one of the following materials: an opaque material, a translucent material and a transparent material. The material choice of the first reflector 30 and the second reflector 32 may be selected based on the needs of the patient, so the light may be reflected to the third reflector 24 and the sight of the patient may stay unaffected.

Figure 4A:
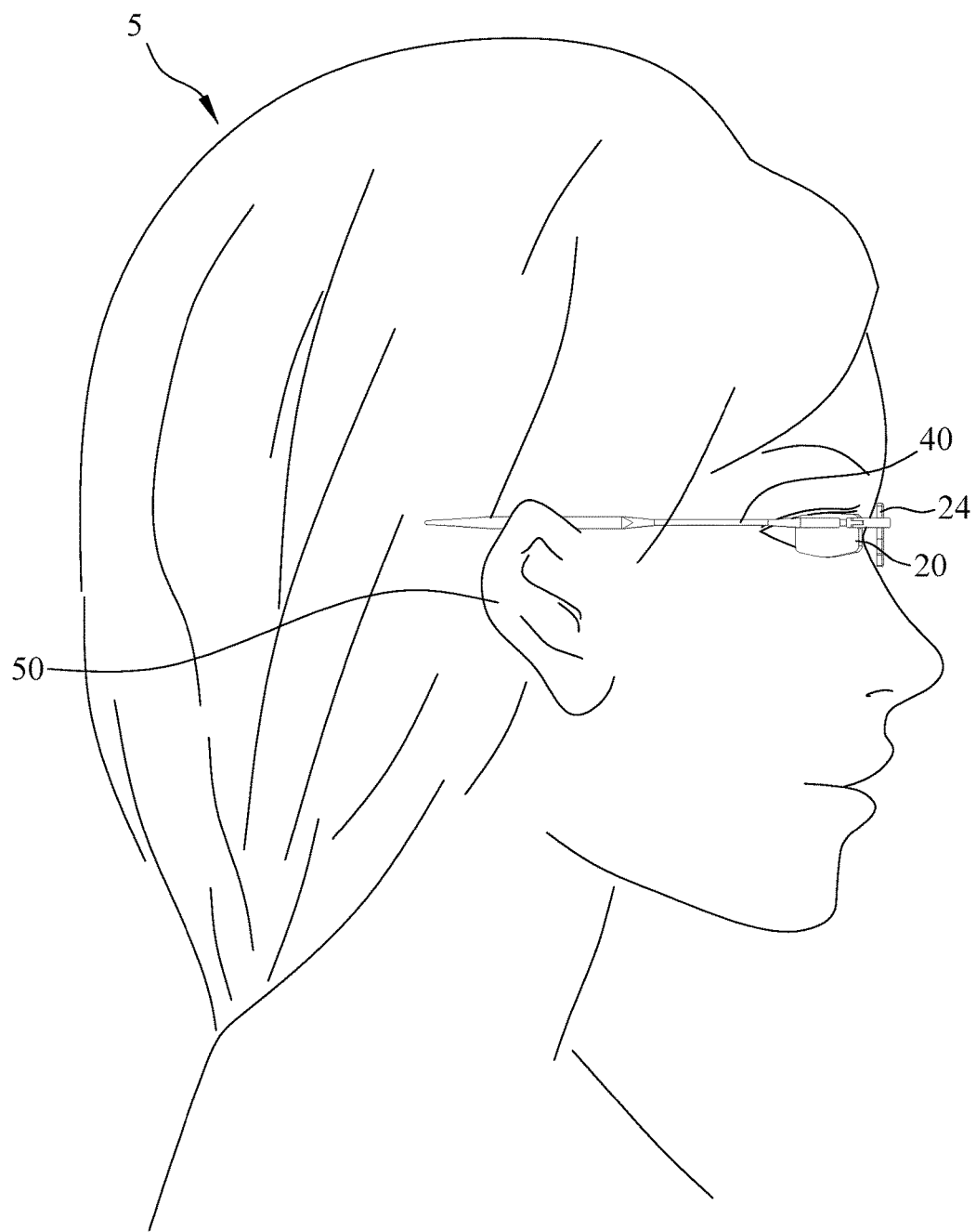
FIG. 4a is a schematic view illustrating an implementation of the vision assistive device according to an embodiment of the present invention.
Figure 4B:
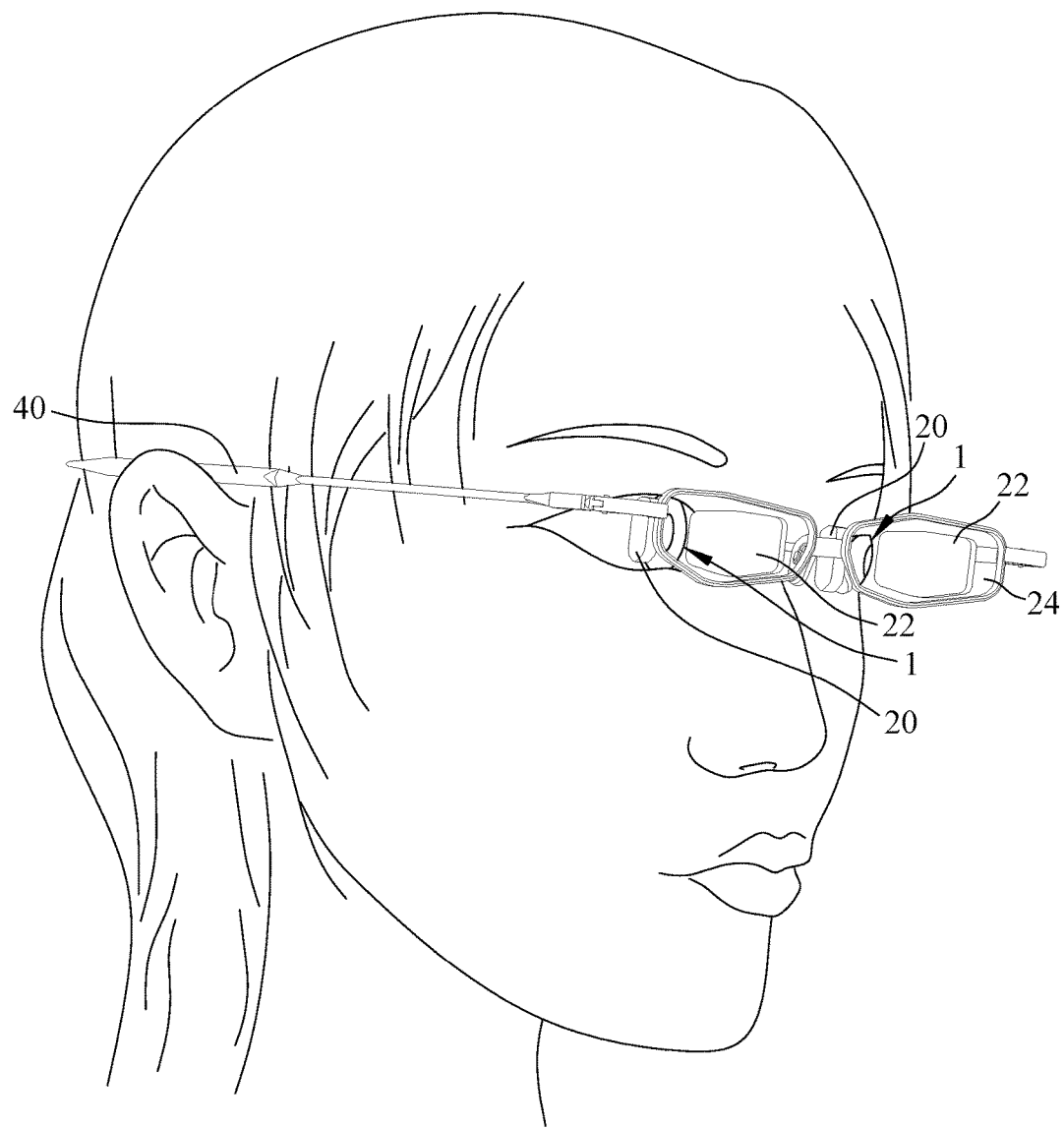

FIG. 4a is a schematic view illustrating an implementation of the vision assistive device according to an embodiment of the present invention; and FIG. 4b is a schematic view illustrating the human eye shown in FIG. 4a. Please refer to FIGS. 4a and 4b together, in one embodiment of the present invention, the first reflector 20, the second reflector 22 and the third reflector 24 may be disposed at the first position, the second position and the front position of the cornea (not shown in FIGS. 4a and 4b) of the human eye respectively by way of hanging via a frame 40 (or may be mounted at the respective positions in ways similar to an eyeglasses). Herein, the frame 40 may be implemented as a headwear device. Specifically, when a user 5 needs to put on the vision assistive device of the present invention, the user 5 may put the frame 40 of the headwear device onto his/her ears (in ways similar to an eyeglasses). Once the frame 40 is put in place, the first reflector 20, the second reflector 22 and the third reflector 24 hanging on the frame 40 are located at the first position, the second position (left edge and right edge of the cornea) and the front position of the cornea (not shown in FIGS. 4a and 4b) of the human eye, respectively. In such a way, the external light may be focused and reflected into the human eye in a more effective way, and the light intensity of the light received by the patient may be enhanced. As a result, patients with the night blindness condition may be able to see in environments with low light. It should be understood that the first reflector 20 and the second reflector 22 may also have a shape of a semicircular arc, respectively, so the external light can be further enhanced.

Notably, even though the vision assistive device of the present invention is implemented as a headwear device with a frame in the abovementioned embodiments, but it is not limited thereto. The vision assistive device of the present invention may also be put on the head of the patient through other methods. For example, the vision assistive device of the present invention may be provided in a form similar to contact lenses, so the two reflectors are disposed at the left and right side areas of the cornea, and the third reflector is directly disposed in front of the human eye.

In short, the vision assistive device provided by the present invention is capable of focusing and reflecting external light into human eyes. In such a way, when the patient is in environments with relatively low light, the vision assistive device of the present invention may assist the patient to see clearly by focusing and reflecting light in the surrounding environments.

Although the operation of the method according to the embodiments of the present invention has been described in a certain order, it is not meant to limit the order of the steps. It should be apparent to those skilled in the art that the method can also be performed in a different order. Therefore, the order of the steps should not be considered as a limitation to the claims of the present invention. In addition, the method in the claims should not be limited by the order of steps described above. Those who are skilled in the art should understand that the order of the steps can be changed without departing from the scope of the present invention.

Although the present invention has been described with reference to the preferred embodiments thereof, it is apparent to those skilled in the art that a variety of modifications and changes may be made without departing from the scope of the present invention which is intended to be defined by the appended claims. In addition, the examples disclosed in the specification are only for illustrative purpose but to limit the scope of the present invention. The scope of the present invention should only be defined by the appended claims.

What is claimed is:

1. A vision assistive device capable of enhancing light receiving, comprising:
   a first reflector disposed at a first position of a cornea of a human eye, the first position being located at a right edge of the cornea so that the cornea is on a front reflection side of the first reflector and external light from a back side behind the first reflector passing through the first reflector and the right edge is focused to the human eye, enhanced and amplified partially;
   a second reflector disposed at a second position of the cornea of the human eye, the second position being located at a left edge of the cornea so that the cornea is on a front reflection side of the second reflector and external light from a back side behind the second reflector passing through the second reflector and the left edge is focused to the human eye, enhanced and amplified partially; and
   a third reflector disposed directly in front of the cornea of the human eye;
   wherein the first reflector and the second reflector are configured to reflect external light such that the reflected external light is focused at the third reflector; and
   wherein the reflected external light is reflected again to the human eye by the third reflector, thereby enhancing a light intensity of the external light received by the human eye.

2. The vision assistive device according to claim 1, wherein the first reflector and the second reflector are shaped as a semicircular arc or are configured to have a rectangular shape, respectively.

3. The vision assistive device according to claim 2, wherein when the first reflector and the second reflector are shaped as the semicircular arc, the first reflector and the second reflector are configured to surround the human eye.

4. The vision assistive device according to claim 1, wherein the third reflector has a circular shape or a rectangular shape.

5. The vision assistive device according to claim 1, wherein the first reflector, the second reflector and the third reflector are disposed at the first position, the second position and a front position of the cornea of the human eye respectively by way of hanging via a frame.

6. The vision assistive device according to claim 5, wherein the frame is implemented as a headwear device.

7. The vision assistive device according to claim 1, wherein the first reflector and the second reflector are directly disposed on the cornea of the human eye at the first position and the second position.

8. The vision assistive device according to claim 1, wherein the third reflector is made of a translucent material or a transparent material.

9. The vision assistive device according to claim 1, wherein the first reflector and the second reflector are made of one of the following materials: an opaque material, a translucent material and a transparent material.

* * * * *